United States Patent
Gugaliya et al.

(10) Patent No.: US 10,606,251 B2
(45) Date of Patent: Mar. 31, 2020

(54) METHOD FOR CONTROLLING A PROCESS PLANT USING TRANSITION DATA

(71) Applicant: ABB Schweiz AG, Baden (CH)

(72) Inventors: Jinendra Gugaliya, Bangalore (IN); Naveen Bhutani, Bangalore (IN); Nandkishor Kubal, Bangalore (IN); Kaushik Ghosh, Bangalore (IN); Moncef Chioua, Heidelberg (DE)

(73) Assignee: ABB Schweiz AG, Baden (CH)

( * ) Notice: Subject to any disclaimer, the term of this patent is extended or adjusted under 35 U.S.C. 154(b) by 171 days.

(21) Appl. No.: 15/545,722

(22) PCT Filed: Jan. 22, 2016

(86) PCT No.: PCT/IB2016/050322
§ 371 (c)(1),
(2) Date: Jul. 23, 2017

(87) PCT Pub. No.: WO2016/116896
PCT Pub. Date: Jul. 28, 2016

(65) Prior Publication Data
US 2018/0004193 A1    Jan. 4, 2018

(30) Foreign Application Priority Data

Jan. 24, 2015 (IN) .......................... 6549/CHE/2014

(51) Int. Cl.
*G05B 17/02*     (2006.01)
*G05B 19/418*    (2006.01)
(Continued)

(52) U.S. Cl.
CPC ... *G05B 19/41875* (2013.01); *G05B 19/0426* (2013.01); *G05B 19/056* (2013.01);
(Continued)

(58) Field of Classification Search
None
See application file for complete search history.

(56) References Cited

U.S. PATENT DOCUMENTS 6,438,430 B1 *   8/2002   Martin ............... G05B 13/042
                                                         700/28
6,564,119 B1 *   5/2003   Vaculik ............... B22D 11/16
                                                         164/151.5
(Continued)

FOREIGN PATENT DOCUMENTS

DE   10 2007 036247 A1   3/2008
WO       200241091 A1    5/2002
(Continued)

OTHER PUBLICATIONS

International Search Report, International Application No. PCT/IB2016/050322, dated Mar. 24, 2016, 4 pages.
(Continued)

*Primary Examiner* — Chun Cao
*Assistant Examiner* — Gary Collins
(74) *Attorney, Agent, or Firm* — Barnes & Thornburg LLP

(57) ABSTRACT

The present invention discloses a method for controlling a process in a process plant using a controller. The method comprises receivable associated with the process, determining a first value of at least one key performance indicator associated with the transition from the process data of the first process variable between the first steady state and the second steady state, comparing the determined first value of the at least one key performance indicator against a threshold value of the at least one key performance indicator; and determining a correction factor for modifying a set point of the process variable based on the comparison, for controlling the process.

10 Claims, 3 Drawing Sheets

(51) Int. Cl.
*G05B 19/042* (2006.01)
*G05B 19/05* (2006.01)
*G05B 23/02* (2006.01)

(52) U.S. Cl.
CPC .......... *G05B 23/0235* (2013.01); *G05B 17/02* (2013.01); *G05B 23/024* (2013.01); *G05B 2219/1171* (2013.01); *Y02P 90/18* (2015.11); *Y02P 90/22* (2015.11)

(56) References Cited

U.S. PATENT DOCUMENTS

| | | | |
|---|---|---|---|
| 2002/0128731 A1 | 9/2002 | Wegerich et al. | |
| 2003/0120361 A1* | 6/2003 | Anderson | C08F 10/00 700/31 |
| 2003/0149493 A1* | 8/2003 | Blevins | G05B 13/048 700/18 |
| 2006/0155410 A1* | 7/2006 | Yamartino | G05B 17/02 700/108 |
| 2007/0250214 A1 | 10/2007 | Lee et al. | |
| 2014/0336984 A1 | 11/2014 | Starr | |

FOREIGN PATENT DOCUMENTS

| | | |
|---|---|---|
| WO | 2008014341 A1 | 1/2008 |
| WO | 2012042363 A1 | 4/2012 |

OTHER PUBLICATIONS

International Written Opinion issued in connection with International Application No. PCT/IB2016/050322, dated Mar. 24, 2016, 6 pages.

International Preliminary Report on Patentability, International Application No. PCT/IB2016/050322, dated Jul. 25, 2017, 7 pages.

* cited by examiner

METHOD FOR CONTROLLING A PROCESS PLANT USING TRANSITION DATA

CROSS-REFERENCE TO RELATED APPLICATIONS

This application is a U.S. national stage of International Application Serial No. PCT/IB2016/050322, filed Jan. 22, 2016, which claims priority to Indian Patent Application No. 6549/CHE/2014, filed Jan. 24, 2015. The entire disclosures of both of the foregoing applications are hereby incorporated by reference.

FIELD OF INVENTION

The present invention relates to control systems and industrial automation. More particularly, the present invention relates to utilising transition data for controlling processes.

BACKGROUND

Often in manufacturing process industries such as cement industry, paper industry, metallurgical process industry, certain processes can produce various grade of product across a span of time. For example, in paper manufacturing, by modifying the relevant process variable, various grades of paper can be produced over a period of time. The term "grade" identifies a set of product specifications, such as sheet weight, sheet calliper, sheet brightness, sheet colour, etc. The process in which the process line, which is initially configured to produce sheets of one specification, is transitioned to produce sheets of another specification is referred to as a grade change or a transition.

Conventionally, in terms of control philosophy such transitions are defined as a change of output parameter of a process due to a notable shift in the operating point or parameters of the process. The shift or change in the operating point by the plant control that is interfaced with the various controllers and other devices in the plant. Specifically, the plant control system automates the operational set points of various functional components of the continuous process to ensure the product is produced in accordance with the new product specification identified by the grade change or transition.

While control of processes in steady-state are well-established and are effectively and efficiently performed by conventional control systems, such control systems offer inadequate performance when used to control processes having a plurality of transitions.

Therefore, there is a need for a system and method that can effectively control processes having one or more transitions.

BRIEF DESCRIPTION OF THE INVENTION

In one aspect, the present invention discloses a method for controlling a process in a process plant using a controller. The process plant includes one or more field devices.

At a first instance of time, the process is in a first steady state wherein the controller controls the process within first operating region. At a second instance of time the process is in a second steady state wherein the controller controls the process within second operating region. Between the first instance of time and the second instance of time, the process undergoes a transition between the first steady state and second steady state.

The method comprises receiving process data from at least field device in relation to a first process variable associated with the process, determining a first value of at least one key performance indicator associated with the transition from the process data from at least one field device between the first steady state and the second steady state, comparing the determined first value of the at least one key performance indicator against a threshold value associated with the at least one key performance indicator, and determining a correction factor for a process variable to be corrected based on comparison.

In an embodiment, the method further comprises receiving process data of a second process variable associated with the process, comparing the process data of the first process variable and the process data of the second process variable against a model of transition.

In an embodiment, the at least one key performance indicator is one of time period between start of transition and end of transition, percentage of overshoot in transition, number of oscillations in transition, gradient of transition. In yet another embodiment, the at least one key performance indicator is based on a weighted average of one or more of time period between start of transition and end of transition, percentage of overshoot in transition, number of oscillations in transition, gradient of transition.

In another aspect, a system for controlling a process in a process plant. The system comprising one or more field devices, a controller operatively coupled to the one or more field devices to control the process based on one or more predetermined set points, a historian configured to store historic process data, and a server communicatively coupled to the controller and the historian.

The server is configured to receive process data from at least field device in relation to one or more process variable associated with the process, determine a first value of at least one key performance indicator associated with the transition from the process data of a first process variable between the first steady state and the second steady state, compare the determined first value of the at least one key performance indicator against a threshold value associated with the at least one key performance indicator, and determine a correction factor for a process variable to be corrected based on comparison of the first value of the at least one key performing indicator and the threshold value for controlling the process in the process plant.

DETAILED DESCRIPTION OF THE INVENTION

In the following detailed description, reference is made to the accompanying drawings that form a part hereof, and in which is shown by way of illustration specific embodiments, which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

Figure 1:
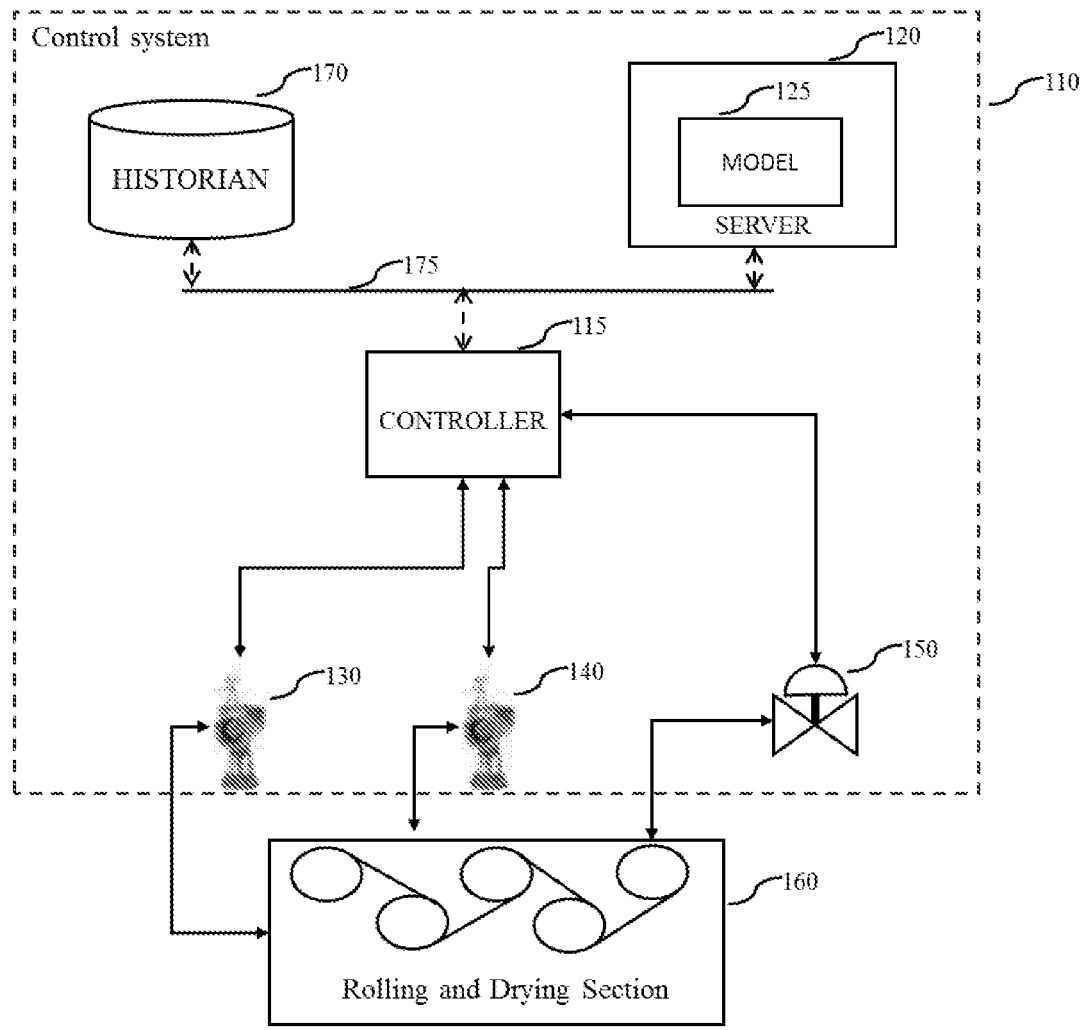
FIG. 1 illustrates a system for controlling a process using a controller in a process plant, in accordance with various embodiments of the present invention.

FIG. 1 illustrates a system 100 for controlling a process using a controller 115 of a control system 110 in a process plant. The controller 115 is connected to a plurality of field devices (130, 140 and 150) for controlling a rolling and drying section 160 of the process plant on the basis of the set points stored in the controller 115. The plurality of field devices (130, 140 and 150) includes one or more sensors (shown in the figure as sensor 130 and sensor 140) located in various areas of the section 160 for measuring process variables associated with the process. These process variables are herein referred to as measured process variables. The controller 115 receives measurements in relation to one or more process variables from the sensors 130 and 140 for regulating the process in the rolling and drying section 160.

Additionally, the plurality of field devices includes one or more actuators (shown in the figure as valve 150) which regulate various physical parameters in relation to the process in the section 160. The one or more actuators including the valve 150 are operatively coupled to the controller 115. The controller 115 operates the one or more actuators to regulate the process in the rolling and drying section 160 on the basis of the measurements from the sensors and the set points.

Further, the controller 115 is communicatively coupled to a server 120 via communication channel 175. The controller 115 transmits the measurements of the one or more process variables from the field devices to the server 120. The server 120 is configured to receive the measurements of the one or more process variables (also referred to as process data) from the controller 115 and determine a first steady state, a second steady state and a transition between the first and second steady in the process data. Then the server 120 determines a first value of at least one key performance indicator associated with the transition from the process data. Subsequently, the server 120 compares the determined first value of the at least one key performance indicator against a threshold value associated with the at least one key performance indicator and determines a correction factor for modifying a process variable to be corrected based on comparison of the first value of the at least one key performing indicator and the threshold value associated with the at least one key performance indicator for controlling the process in the process plant.

In an embodiment, upon determining the correction factor, the server 120 sends the correction factor to the controller 115 which accordingly, corrects the set point of the corresponding process variable to be corrected on the basis of the recommended correction factor. In another embodiment, the server 120 sends the correction factor in relation to the process variable to be corrected to an upstream device or a downstream device to take necessary regulatory action.

Additionally, the control system 110 includes a historian 170. The historian 170 is configured to store historic process data. The server 120 utilizes the historic data to determine the threshold value associated with the at least one key performance indicator. In an embodiment, the server 120 analyses historic process data of a plurality of process variables. The server 120 identifies a plurality of transitions between the first steady state and the second steady state, determines a statistical parameter or statistical representative value such as mean value associated with the at least one key performance indicator determined from the plurality of transitions, and sets the threshold value to the determined statistical representative value, which in the current example, is the determined mean value.

In an embodiment the server 120 is configured to receive proves data of a second process variable from a second field device. Then the server 120 compares the process data of the first process variable and the process data of the second process variable to a model of transition to determine the process variable to be corrected. In an embodiment, the model of transition is a multivariate principal component analysis model used to determine the process variable to be corrected by identifying whether the first process variable or the second process variable or combination thereof contributed to the transition being abnormal. The server 120 builds the model of the transition by utilizing the historic process data of the first and second process variables. In an embodiment, the server 120 determines a plurality of transitions from the historic process data. Then the server 120 determines at least one key performance indicator for each of the transition from the plurality of transitions. Based on the at least one key performance indicator, the server 120 selects a set of transitions whose value of at least one key performance indicator is above a particular threshold or below a particular threshold as needed. The server 120 utilizes the process data during these selected transitions to build the model of transition. These aspects are further explained in the description of FIG. 2.

It is to be noted by a person skilled in the art that which the figure illustrates one configuration of the system 100, various other configuration are possible and are conventionally known to a person skilled in the art. For example, in an embodiment, the server 120 is connected to directly or indirectly (via an I/O interface or a relay interface) to the one or more field devices for receiving the process data. In an embodiment, the historian 170 is a part of the server 120.

Similarly, it is to be noted by a person skilled in the art that the statistical methods utilized above to explain the system are merely illustrative and can be substituted by a plurality of conventionally known statistical methods. For example, the principal component analysis model can be substituted by a regression model, partial least squares (PLS) model.

Figure 2:
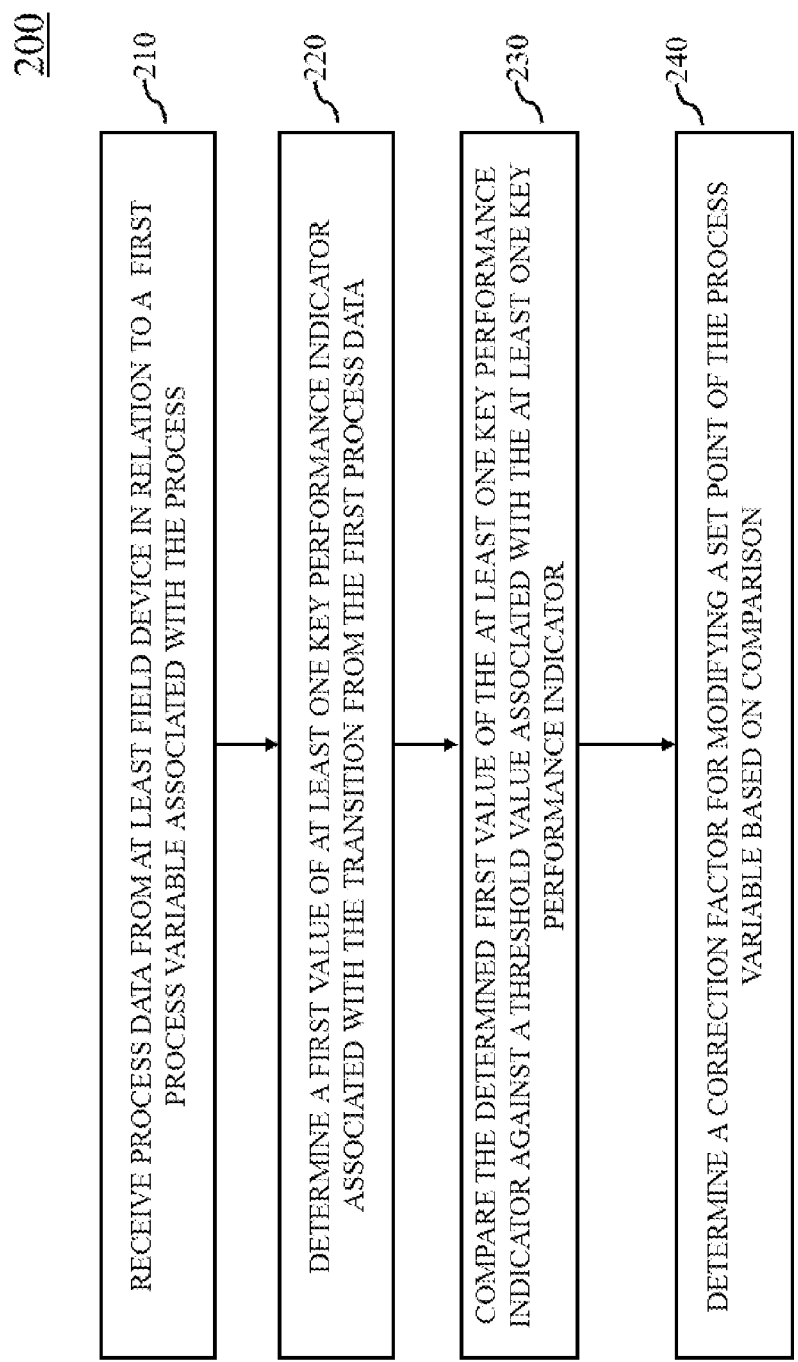
FIG. 2 illustrates a method for a system for controlling a process using a controller in a process plant, in accordance with various embodiments of the present invention.

FIG. 2 illustrates a method 200 for controlling a process using a controller 115 in the process plant, in accordance with various embodiments of the present invention. The current method is detailed below and is explained using exemplary graphs of process data of the process variable basis weight (shown in graph 310), process variable reel moisture (shown in graph 320) and the process variable size moisture (shown in graph 330) illustrated in FIG. 3.

Figure 3:
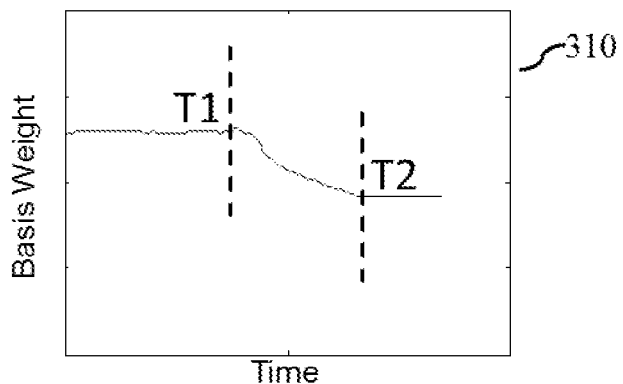
FIG. 3 illustrates process data of three process variables over a span of time.
Figure 3:
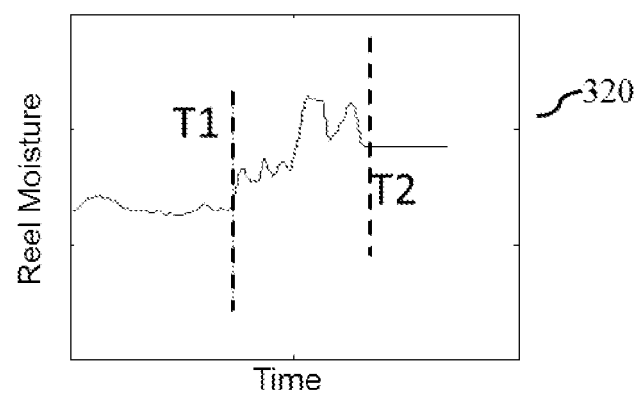
Figure 3:
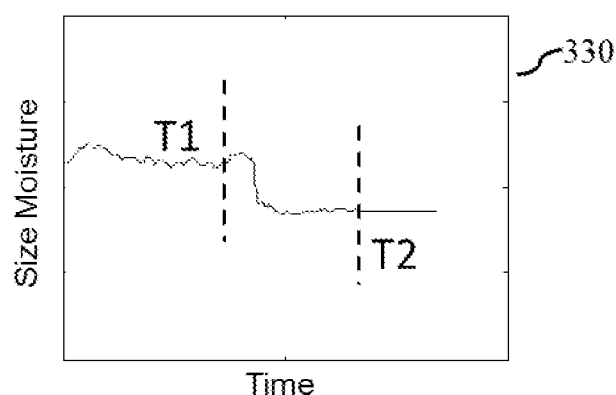

At a first instance of time, the process is in a first steady state where the controller 115 controls the process within first operating region. The term steady state herein refers to a period of time where the values of the process variables are uniform or substantially uniform i.e. within a band or range of threshold values. Referring to FIG. 3, it can be seen that the process is at a first steady state till instance of time T1, as all the three exemplary process variables (basis weight, size moisture and reel moisture) are relatively stable.

At a second instance of time, the process is in a second steady state where the controller 115 controls the process within second operating region. In between the first steady state and the second steady state, the grade of the resultant product from the process of the rolling and drying section 160 is changed. Accordingly, the operating point of the controller 115 is modified. Therefore, the process undergoes a transition between the first steady state and second steady state.

Similarly, referring to FIG. 3, it can be seen that at instance of time T2, the process has stabilised and is in a second steady state, as all the three exemplary process variables basis weight, reel moisture and size moisture are relatively stable after T2. Based on the rate of change of the values of the process variable basis weight, size moisture and reel moisture, the server 120 determines that a transition has taken place between instance of time T1 and instance of time T2.

At step 210, the server 120 receives process data of from a first field device in relation to a first process variable associated with the process. The server 120 continuously receives process data of the field devices (130, 140 and 150) through the controller 115.

Continuing the above mentioned example, the server 120 continuously receives process data associated with basis weight, reel moisture and size moisture. The server 120 continuously determines a rate of change or gradient for each variable for all three process variables Immediately after or at T1, the rate of change of value the process variables reel moisture and size moisture are above a predetermined threshold value, and accordingly the server 120 determines that a transition has started Similarly, at T2, the rate of change for all the process variables are below the predetermined threshold value and accordingly, the server 120 decides that the transition has ended.

At step 220, the server 120 determines a first value of at least one key performance indicator associated with the transition from the process data of the first process variable. Herein key performance indicator refers to a score or a grade indicative of the profile of the transition as seen in the process variable. For example, key performance indicator includes, but is not limited to, transition time i.e. time taken to go from first steady state to second steady state, percentage of overshoot, smoothness index, number of oscillations as seen in the process data of the at least one process variable. etc. In an example, the smoothness index is determined by server 120 by fitting a quadratic path between the end instance of the first steady state and the beginning instance of the second steady state as seen from the process data of the first process variable, and then by quantifying the deviation of the first process variable from the quadratic path during the transition. Similarly, by using N order paths between the end instance of the first steady state and the beginning instance of the second steady state, the deviation of the first process variable can be quantified.

When the transition is observed in process data of one or more process variables, one or more values of the key performance indicator are calculated from process data of the one or more process variables.

Continuing the above mentioned example, the server 120 calculates the value of percentage of overshoot for basic weight, reel moisture and size moisture from the corresponding process data of basic weight, reel moisture and size moisture between T1 and T2.

At step 230, the server 120 compares the determined first value of the at least one key performance indicator against the threshold value associated at least one key performance indicator. Continuing the above mentioned example, the server 120 compares the three first values of the percentage of the overshoot against the threshold value of the percentage of overshoot.

In an embodiment, the at least one key performance indicator is based on a weighted average of one or more of time period between start of transition and end of transition, percentage of overshoot in transition, number of oscillations in transition, gradient of transition.

At step 250, based on the above mentioned comparison, the server 120 determines a correction factor for modifying a set point of the process variable stored in the controller for controlling the process in the process plant. Continuing the above mentioned example, when the three first value of percentage of overshoot in all the three process variables is greater than the threshold value associated with percentage of overshoot, the server 120 calculates a correction factor for a set point of a process variable used by the controller on the basis of the difference between the three first values and the three threshold value.

In an embodiment, the server 120 is configured to receive process data of a second process variable. The server 120 then compares the process data of the first process variable and the process data of the second process variable between the first steady state and the second steady state to a model of transition. When there are one or more process variables, server 120 is configured to determine the influence of each process variable in the transition using the model of transition.

Continuing the above mentioned example, the server 120 determines the influence of reel moisture, size moisture, and basis weight on the transition between T1 and T2 by performing a principal component analysis using a multivariate model of transition generated from historic process data of the three variables.

In an embodiment, the server 120 is configured to perform the above mentioned method using offline process data of one or more process variables taken from field devices across a batch operation or a predetermined period of time in case of a continuous operation. The server 120 utilises the above mentioned rate of change to determine a plurality of steady states and a plurality of transitions in the process data of the one or more variables. Subsequent to detection of all the steady states, the server 120 clusters all steady states that are similar to each other into groups or clusters. Then the server 120 calculates a transition matrix map.

Transition Map is a matrix which shows the number of transitions that have been taken place between any two non-clustered Steady states. The number of transitions that take place between every steady state and the other steady state is counted and stored as the cell element in the transition matrix. Then the server 120 considers the transitions between those steady states that have a large number of transitions (more than a predetermined threshold). Accordingly, the server 120 applies the above mentioned method to the selected transitions.

The current invention allows for utilization of process data during transition for effective and efficient control of the process. By monitoring the grade of the transition, the system 100 can accordingly regulate the process.

This written description uses examples to describe the subject matter herein, including the best mode, and also to enable any person skilled in the art to make and use the subject matter. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for controlling a process in a process plant having one or more field devices using a control system having a controller, the process including a first steady state wherein the controller controls the process within a first operating region, a second steady state wherein the controller controls the process within a second operating region, and a transition between the first steady state and second steady state, the method comprising:
  receiving process data in relation to a first process variable and a second process variable from the one or more field devices associated with the process;
  determining a first value of at least one key performance indicator corresponding to the process data of the first process variable received between the first steady state and the second steady state, wherein the at least one key performance indicator is indicative of a profile of the transition;
  determining a second value of the at least one key performance indicator corresponding to the process data of the second process variable received between the first steady state and the second steady state;
  comparing the first value with a first threshold value corresponding to the at least one key performance indicator wherein the first threshold value is calculated from one or more transitions from historic process data of the first process variable;
  comparing the second value with a second threshold value different from the first corresponding to the at least one key performance indicator wherein the second threshold value is calculated from one or more transitions from historic process data of the second process variable;
  determining an influence of the first process variable and an influence of the second process variable on the transition by performing a principal component analysis using a model of the transition to identify whether the first process variable or the second process variable or a combination thereof contributed to the transition being abnormal;
  determining a process variable to be corrected by comparing the process data of the first process variable and the process data of the second process variable to the model of the transition;
  determining one or more correction factors for a set point of the determined process variable used by the controller based on comparison of the first value of the at least one key performance indicator with the first threshold value and comparison of the second value of the at least one key performance indicator with the second threshold value; and
  transmitting the one or more correction factors to the controller to modify the set point of the determined process variable using the one or more correction factors to control the process in the process plant.

2. The method as claimed in claim 1, wherein the at least one key performance indicator is one of a time period between start of transition and end of transition, a percentage of overshoot in transition, a number of oscillations in transition, and a gradient of transition.

3. The method as claimed in claim 1, wherein the at least one key performance indicator is based on a weighted average of one or more of a time period between start of transition and end of transition, a percentage of overshoot in transition, a number of oscillations in transition, and a gradient of transition.

4. The method as claimed in claim 1, wherein the model of the transition is developed based on a first set of transitions between a first set of steady states from the historic process data of the first and second process variables, wherein the historic process data includes a plurality of transitions between a plurality of steady states and wherein a number of occurrences of each transition from the first set of transitions is greater than a predetermined threshold.

5. The method as claimed in claim 1, wherein the model of the transition is indicative of a desired value of the first value and the second value at each of a plurality of times.

6. The method as claimed in claim 1, wherein the at least one key performance indicator is a number of oscillations in transition.

7. The method as claimed in claim 1, wherein the at least one key performance indicator is a percentage of overshoot in transition.

8. The method as claimed in claim 1, wherein the at least one key performance indicator is a gradient of transition.

9. A system for controlling a process in a process plant, the process including a first steady state, a second steady state, and a transition between the first steady state and second steady state, the system comprising:
  one or more field devices;
  a controller operatively coupled to the one or more field devices to control the process;
  a historian configured to store historic process data associated with one or more process variables; and
  a server communicatively coupled to the controller and the historian, the server configured to:
    receive process data from the one or more field devices in relation to a first process variable and a second process variable associated with the process;
    determine a first value of at least one key performance indicator associated with the transition from the process data and corresponding to the first process variable received between the first steady state and the second steady state;
    determine a second value of the at least one key performance indicator associated with the transition from the process data and corresponding to the second process variable received between the first steady state and the second steady state;
    compare the determined first value of the at least one key performance indicator against a first threshold value associated with the at least one key performance indicator;
    compare the determined second value of the at least one key performance indicator against a second threshold value associated with the at least one key performance indicator;
    determine an influence of the first process variable and an influence of the second process variable on the transition by performance of a principal component analysis with use of a model of the transition to identify whether the first process variable or the second process variable or a combination thereof contributed to an abnormality of the transition;
    determine a process variable to be corrected by comparing the process data of the first process variable and the process data of the second process variable to the model of the transition;
    determine one or more correction factors for a set point of the determined process variable used by the controller based on comparison of the first value of the at least one key performance indicator and the first threshold value and comparison of the second value of the at least one key performance indicator with the second threshold value; and
    transmit the one or more correction factors to the controller;

wherein the controller is configured to modify the set point of the determined process variable using the one or more correction factors to control the process in the process plant.

10. The system as claimed in claim 9, wherein the model of the transition is developed based on a first set of transitions between a first set of steady states from the historic process data of the first and second process variables, wherein the historic process data includes a plurality of transitions between a plurality of steady states and wherein a number of occurrences of each transition from the first set of transitions is greater than a predetermined threshold.

* * * * *